United States Patent
Döner (10) Patent No.: US 11,503,354 B2
(45) Date of Patent: Nov. 15, 2022

(54) METHODS AND APPARATUS FOR STREAMING DATA

(71) Applicant: Vestel Elektronik Sanayi ve Ticaret A.S., Manisa (TR)

(72) Inventor: Çagdas Döner, Manisa (TR)

(73) Assignee: VESTEL ELEKTRONIK SANAYI VE TICARET A.S., Manisa (TR)

( * ) Notice: Subject to any disclaimer, the term of this patent is extended or adjusted under 35 U.S.C. 154(b) by 0 days.

(21) Appl. No.: 16/618,020

(22) PCT Filed: Dec. 27, 2017

(86) PCT No.: PCT/EP2017/084662
§ 371 (c)(1),
(2) Date: Nov. 27, 2019

(87) PCT Pub. No.: WO2018/219487
PCT Pub. Date: Dec. 6, 2018

(65) Prior Publication Data
US 2020/0195996 A1     Jun. 18, 2020

(30) Foreign Application Priority Data
May 30, 2017   (EP) .................................... 17173540

(51) Int. Cl.
*H04N 21/2662* (2011.01)
*H04N 21/234* (2011.01)
*H04N 21/2343* (2011.01)

(52) U.S. Cl.
CPC ... *H04N 21/2662* (2013.01); *H04N 21/23406* (2013.01); *H04N 21/23439* (2013.01); *H04N 21/234363* (2013.01)

(58) Field of Classification Search
CPC ......... H04N 21/2662; H04N 21/23406; H04N 21/234363; H04N 21/23439
(Continued)

(56) References Cited

U.S. PATENT DOCUMENTS 5,640,320 A * 6/1997 Jackson ................ G11B 27/34
700/87
5,699,123 A * 12/1997 Ebihara .................... H04N 5/57
348/913

(Continued)

FOREIGN PATENT DOCUMENTS

EP       2785067 A1    10/2014
WO    2011/038013 A2    3/2011
(Continued)

*Primary Examiner* — Tauqir Hussain
(74) *Attorney, Agent, or Firm* — J. Miguel Hernandez; James R. Gourley; Carstens, Allen & Gourley, LLP (57) ABSTRACT

There is provided a method of and apparatus for streaming data. Data segments containing audio and/or video data content are received over a network. The data segments are stored in a buffer. It is determined that the network has capacity to provide the content in the data segments at a higher quality than is currently stored in the buffer prior to playout of the data segments. A higher quality version of content of one or more data segments in the buffer that have the latest relative playout time are requested in preference to requesting a higher quality version of content of data segments that have earlier relative playout times.

12 Claims, 4 Drawing Sheets

(58) Field of Classification Search
USPC .......................................................... 709/231
See application file for complete search history.

(56) References Cited

U.S. PATENT DOCUMENTS

| | | | | |
|---|---|---|---|---|
| 5,996,015 | A * | 11/1999 | Day | H04N 21/4143 348/E7.071 |
| 7,191,462 | B1 * | 3/2007 | Roman | H04N 7/17318 348/E7.071 |
| 7,979,584 | B1 * | 7/2011 | Li | G06F 16/1748 709/247 |
| 10,505,837 | B1 * | 12/2019 | Richard | H04L 45/22 |
| 10,638,166 | B2 * | 4/2020 | Chen | H04N 21/2223 |
| 2003/0090398 | A1 * | 5/2003 | Rijavec | H03M 7/3088 341/55 |
| 2004/0122662 | A1 * | 6/2004 | Crockett | G10L 21/04 704/E21.017 |
| 2004/0268369 | A1 * | 12/2004 | Debique | H04L 65/604 719/328 |
| 2005/0066063 | A1 * | 3/2005 | Grigorovitch | H04N 21/8456 710/1 |
| 2005/0244137 | A1 * | 11/2005 | Takashima | G11B 27/034 386/318 |
| 2006/0155706 | A1 * | 7/2006 | Kalinichenko | G06F 16/9535 |
| 2007/0133942 | A1 * | 6/2007 | Moors | G11B 27/105 386/346 |
| 2007/0231072 | A1 * | 10/2007 | Jennings | F03B 13/10 405/75 |
| 2009/0006102 | A1 * | 1/2009 | Kan | G10L 25/00 704/E11.001 |
| 2009/0059004 | A1 * | 3/2009 | Bochicchio | B66F 17/003 348/148 |
| 2009/0136213 | A1 * | 5/2009 | Calisa | H04N 21/43072 386/223 |
| 2009/0213850 | A1 * | 8/2009 | Viger | H04L 47/10 709/228 |
| 2009/0316719 | A1 * | 12/2009 | Baron | H04L 47/193 370/465 |
| 2010/0061709 | A1 * | 3/2010 | Agnihotri | H04N 21/4821 386/241 |
| 2011/0096828 | A1 | 4/2011 | Chen et al. | |
| 2011/0110646 | A1 * | 5/2011 | Smith | G06V 20/40 386/E5.028 |
| 2011/0164689 | A1 * | 7/2011 | De Neve | H04N 21/6581 375/240.25 |
| 2011/0231569 | A1 * | 9/2011 | Luby | H04N 21/23406 709/234 |
| 2011/0274414 | A1 * | 11/2011 | Nemiroff | G11B 27/28 386/331 |
| 2012/0005368 | A1 * | 1/2012 | Knittle | H04N 21/23805 709/235 |
| 2013/0124748 | A1 | 5/2013 | Virdi et al. | |
| 2014/0025837 | A1 * | 1/2014 | Swenson | H04N 21/23439 709/231 |
| 2014/0195651 | A1 * | 7/2014 | Stockhammer | H04L 65/601 709/219 |
| 2014/0222962 | A1 * | 8/2014 | Mao | H04N 21/8456 709/219 |
| 2014/0282769 | A1 * | 9/2014 | Salem | H04L 67/322 725/94 |
| 2015/0067105 | A1 | 3/2015 | Zhu et al. | |
| 2015/0128170 | A1 * | 5/2015 | Fu | H04L 43/0882 725/32 |
| 2015/0146611 | A1 * | 5/2015 | Joshi | H04L 41/5029 370/328 |
| 2016/0028594 | A1 * | 1/2016 | Ramakrishnan | H04L 67/10 709/224 |
| 2016/0261665 | A1 * | 9/2016 | Stockhammer | H04L 65/4069 |
| 2017/0223395 | A1 * | 8/2017 | Elliot | H04N 21/2402 |
| 2018/0255117 | A1 * | 9/2018 | Ljung | H04L 65/80 |
| 2018/0332316 | A1 * | 11/2018 | Wang | H04N 21/4331 |
| 2019/0124003 | A1 * | 4/2019 | Surcouf | H04L 45/38 |
| 2019/0327425 | A1 * | 10/2019 | Kobayashi | G06V 20/49 |
| 2020/0280595 | A1 * | 9/2020 | Brueck | H04L 65/4069 |

FOREIGN PATENT DOCUMENTS

| | | | |
|---|---|---|---|
| WO | 2011/038034 A1 | 3/2011 | |
| WO | WO-2011038013 A2 * | 3/2011 | ......... H04N 21/8456 |
| WO | 2014081530 A1 | 5/2014 | |

\* cited by examiner

METHODS AND APPARATUS FOR STREAMING DATA

CROSS-REFERENCE TO RELATED APPLICATIONS

This application is a US 371 Application from PCT/EP2017/084662 filed on Dec. 27, 2017, which claims priority to EP Application 17173540.0 filed on May 30, 2017, the technical disclosures of which are hereby incorporated herein by reference.

TECHNICAL FIELD

The present disclosure relates to methods, apparatus and computer programs for streaming data.

BACKGROUND

Communication devices may receive media content in the form of audio and/or video data over a network, such as by streaming. The term streaming is typically used to indicate that the media content is provided by a server over a network to a client communication device (which may be any type of user computing device, such as a mobile or cellular telephone, a laptop computer, desktop computer, tablet, a gaming console, etc.) for playback in substantially real time. This may be contrasted with "downloading", in which an entire file is downloaded, for possible use later for example. The received audio and/or video data may be played out to a user for consumption of the content of the audio and/or video data.

SUMMARY

According to a first aspect disclosed herein, there is provided a method of streaming data, the method comprising: receiving data segments containing audio and/or video content over a network; storing the data segments in a buffer; determining that the network has capacity to provide the content in the data segments at a higher quality than is currently stored in the buffer prior to playout of the data segments; and requesting a higher quality version of the content of one or more data segments in the buffer that have the latest relative playout time in preference to requesting a higher quality version of the content of data segments that have earlier relative playout times.

The method may be a computer implemented method.

The method may comprise determining that a user has paused playout of the data segments stored in the buffer, wherein the determining that the network has capacity and the requesting data segments having a higher quality version are performed in response to determining that the user has paused playout of the data segments stored in the buffer.

The method may comprise determining that the data segments in the buffer comprise the end of an audio and/or video stream, wherein the determining that the network has capacity and the requesting data segments having a higher quality version are performed in response to determining that the data segments in the buffer comprise the end of an audio and/or video stream.

The method may comprise forming a plurality of groups by grouping together data segments in the buffer into groups of a maximum size, such that each data segment in a group has a playout time that is immediately adjacent to the playout time of at least one other data segment in a group, wherein said requesting comprises requesting a higher quality version of the group of data segments having the latest relative playout times.

The method may comprise: receiving a higher quality version of a portion of the content in the buffer; determining that playout of said portion of the content will occur at a playout time that is prior to the higher quality version of said portion of the content being completely received; and causing the lower quality version of said content to be played out at said playout time.

There is provided a computer program comprising computer code that, when executed by a computer, causes the computer to perform a method as described above.

According to a second aspect, there is provided an apparatus for streaming data, the apparatus being constructed and arranged to: request data segments containing audio and/or video content over a network; store the data segments in a buffer; determine that the network has capacity to provide the content in the data segments at a higher quality than is currently stored in the buffer prior to playout of the data segments; and request a higher quality version of the content of one or more data segments in the buffer that have the latest relative playout time in preference to requesting a higher quality versions of the content of data segments that have earlier relative playout times.

The apparatus may be arranged to determine that the network has capacity in response to receiving an indication that a user has paused playout of the data segments.

The apparatus may be arranged to: receive a user input indicating that the higher quality version of one or more data segments should be requested for the data segments having the latest relative playout time should be requested in preference to requesting higher quality versions of data segments that have earlier relative playout times; and store the user input.

The apparatus may be arranged to: request a higher quality version of content comprised in a first data segment in the buffer; determine that playout of the content of said first data segment will occur at a playout time that is prior to the higher quality version being completely received; and cause the lower quality version of said content to be played out at said playout time.

According to a third aspect, there is provided a method of streaming data, the method comprising: transmitting data segments containing audio and/or video data content over a network; receiving a request to transmit a higher quality version of the content of one or more data segments that have the latest relative playout time of the transmitted content in preference to transmitting a higher quality version of the content of data segments that have earlier relative playout times; and transmitting the higher quality version of the content of the one or more data segments having the latest relative playout time.

The method may be a computer implemented method.

There is provided a computer program comprising computer code that, when executed by a computer, causes the computer to perform a method as described above.

According to a fourth aspect, there is provided an apparatus for streaming data, being constructed and arranged to: transmit data segments containing audio and/or video data content over a network; receive a request to transmit a higher quality version of the content of one or more data segments that have the latest relative playout time of the transmitted content in preference to transmitting a higher quality version of the content of data segments that have earlier relative playout times; and transmit the higher quality version of content of the one or more data segments having the latest relative playout time.

BRIEF DESCRIPTION OF THE DRAWINGS

To assist understanding of the present disclosure and to show how embodiments may be put into effect, reference is made by way of example to the accompanying drawings in which.

DETAILED DESCRIPTION

Audio and/or video (A/V) data forming media content may be provided to a communication device over a network using a client/server model.

In such a model, the server (which may in fact be multiple physical servers) receives a request for particular media content from a communication device acting as a client device, and determines whether or not to grant the request.

A/V content may be provided by the server using an adaptive stream using data segments. Adaptive streams aim to adapt the network bandwidth that a streaming device (i.e. a client communication device) is using to obtain the A/V content in order to maximise the quality of received data at any time. A server is configured to provide multiple streams of the same A/V content, each of the streams having a different respective quality to others of the streams. The quality associated with a particular stream may depend on a number of factors, including the resolution of the media content and the encoding quality of the media content. Thus the different streams may be viewed as providing versions of the same media content at different bitrates.

A client may determine a preferred quality (and consequently stream) for the A/V content, in dependence on for example the quality of the communication link over which the client is receiving the A/V content and in dependence on the current processing capacity in the communication device. The preferred stream may be requested by the communication device over the network. The received A/V content may then be played out to a user whilst the stream is still being received.

In known arrangements, when a user pauses playout of the A/V content, data segments comprising the A/V content may continue being received and stored by the communication device in a buffer. When the A/V content has finished been received (for example, if a predetermined playout length has been received and/or the endpoint of the requested content has been received), a stream with a better quality may be requested from the network, and the communication device may re-buffer the A/V content using data segments that provide a higher quality of the A/V content (e.g. at an improved encoding/bit rate).

When the user resumes playout of the A/V content, not all of the higher quality versions of the buffered A/V content may have been received. This leads to jitter in consuming the A/V content that will intermit the viewing/listening experience of a user.

To address this, the following describes an arrangement for replacing buffered data segments of A/V content with data segments having a higher quality version of the content. In particular, the A/V data segments in the buffer are replaced such that the A/V data segments in the buffer that are designated as being the last to be played out in the stream (i.e. towards the end of the streamed content, or at least the portion of the streamed content that has been received) are upgraded first, the A/V data segments that are designated as being the penultimate data segments to be played out are upgraded second, and so on. The quality of the A/V content is thus upgraded in a "backwards" fashion, such that the data segments that have a playout time that is closer to the paused instant (i.e. occurring earlier in the streamed content) will be upgraded last.

By handling the quality upgrade of the A/V data segments in a backwards fashion, a user is less likely to be affected by an intermittent stream upgrade process.

An example client communication apparatus is described with reference to FIG. 1.

Figure 1:
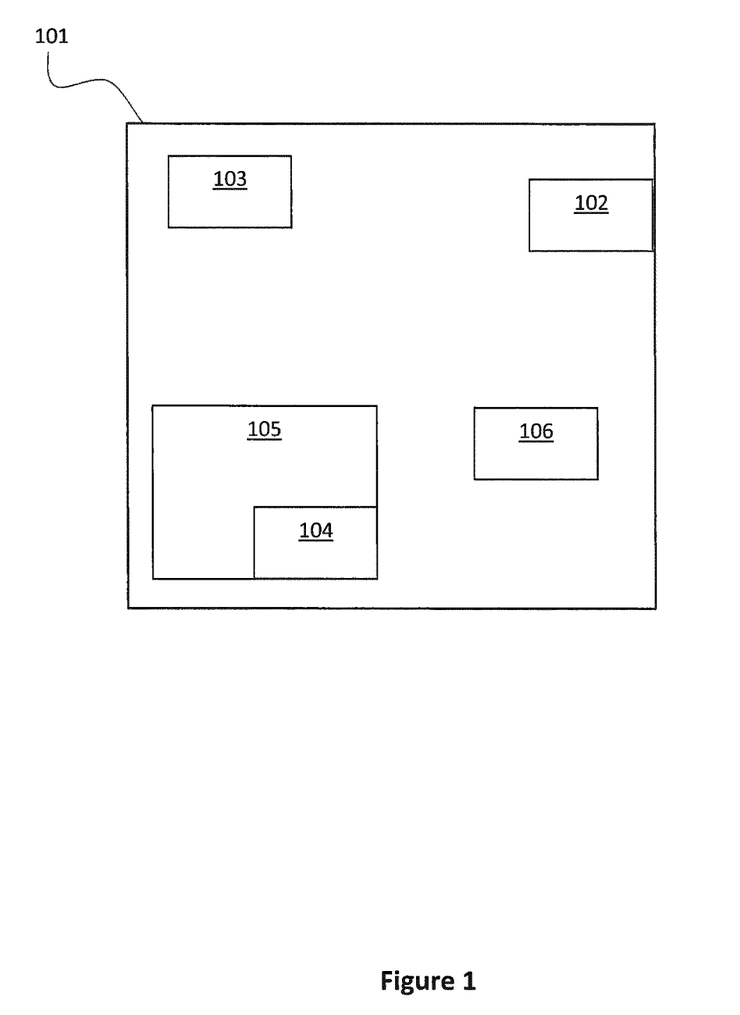
FIG. 1 shows schematically an example communication device.

FIG. 1 illustrates a communication device 101 comprising a receive unit 102, at least one processor 103, memory 104 comprising computer code 105, buffer 106 and transmit unit 107. Transmit unit 107 and receive unit 102 may utilise at least some of the same components for performing their respective operations, or may utilise different components for performing their respective operations. The computer code 105 may include code for streaming and playing back content, such as audio and/or video content.

In operation, the communication device 101 is configured to transmit, using transmit unit 107, a request to a server (not shown) that comprises a request to receive A/V content from the server.

In response to this request, the communication device 101 receives A/V data segments (i.e. data segments comprising A/V content) from the network over a communication link (not shown) at receive unit 102. The communication link may be wired or wireless, and may operate in accordance with any suitable protocol for transmitting A/V data segments, including for example the Internet Protocol, using for example the Real Time Streaming Protocol for streaming the data segments to the communication device 101. The A/V data segments are received at a first quality level. The data segments may be received as packets, data blocks, and/or chunks, depending on the protocol used to transport data over the communication link and to format the A/V content at the application level. The term segment is used herein to refer to any format of a unit of received A/V content. The received data segments are stored in the buffer 106.

At some point, the communication device may stop receiving data segments of the media content. This may be temporary (e.g. if a user pauses playout of the stream) or "permanently" (e.g. when the entire content has been received). In response to this, the communication device may consequently determine that the network has capacity to provide higher quality versions of the A/V content than the first quality. This determination may also consider the quality of the communication link from the network to the client communication device.

In this situation, the communication device may be configured to determine relative playout times of the data segments of received A/V content (as the data segments of the A/V content may be received out of order, the receive time is not the same as the playout time). A playout time is a time at which the media content comprised within an A/V data segment is scheduled to be played out/presented to a user. By determining the relative playout time, the communication device is able to determine which data segment in the buffer is scheduled to be played out last, which data segment is scheduled to be played out last-but-one, etc. Then, when the request for a higher quality stream is transmitted to the server, the communication device may request to receive the higher quality data segments in a "reverse" order, such that data segments having higher quality content and that are scheduled to be played out last (i.e. towards the end of the streamed content, or at least the portion of the streamed content that has been received) are received in preference to those that are scheduled to be played out earlier (i.e. occurring earlier in the streamed content). Whether or not a communication device requests to receive the higher quality data segments in a reverse order may be controlled via a configurable user setting on the communication device. Thus the communication device may be configured to receive an input from a user that configures the communication device to make this request for a reverse order download.

Figure 2:
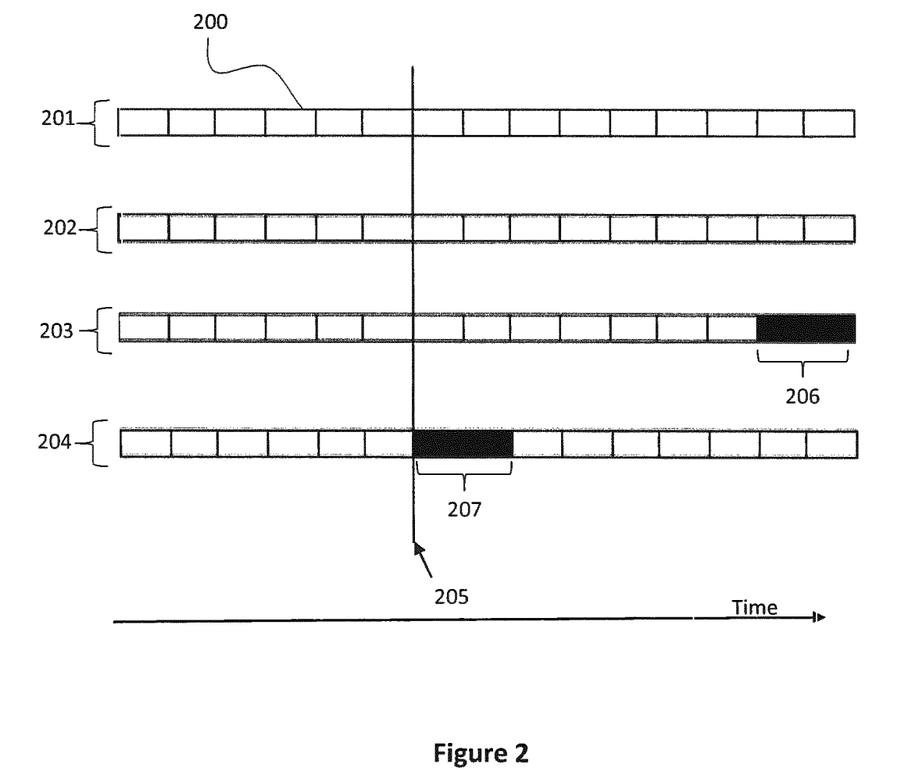
FIG. 2 shows schematically example buffer states.

The above-described mechanism is illustrated with respect to FIG. 2.

FIG. 2 depicts an A/V data stream comprised within a buffer at different time instances 201-204. Each data stream comprises a plurality of data segments 200. A vertical line 205 running through each of the time instances 201-204, denotes a point in playout time at which a user has paused playout of the A/V data stream, with the time increasing along the x axis.

At the first time instance 201, data segments on the left hand side of pause point 205 have been played out. There are no received data segments on the right hand side of pause point 205.

At the second time instance 202 (after the first time instance), the buffer has received data segments relating to a remaining part of the A/V stream. Thus there are data segments on both the right and left hand sides of the pause point 205. These data segments are shown arranged in scheduled playout time, such that the data segment to be played out last is at the far right hand side of the buffer and the data segment to be played out first following resumption of playout of the media content is on the right hand side of and immediately adjacent to pause point 205.

At the third time instance 203 (after the first and second time instances), the buffer is upgrading the last two data segments 206 on the far right hand side of the buffer. In other words, the buffer is upgrading the last two data segments 206 received that are scheduled to be played out.

At the fourth time instance 204 (after the first, second and third time instances), all of the data segments on the right hand side of the pause point 205 (bar the first two data segments 207 immediately adjacent to and following the pause point 205) have been upgraded. The first two data segments 207 are currently being upgraded.

Thus, as is demonstrated by this Figure, after a user has paused a video at a pause point 205, the buffering of the data stream may continue until the A/V data segments have stopped being received. At this point, the content stream gets upgraded (subsequent to a request from the communication device, such that the data segments that are scheduled to be played out last are upgraded first, in preference to those data segments that are scheduled to be played out earlier). This process continues until, finally, the data segments to be played out immediately following the pause point are played out.

Updating the video from the end of the stream instead of the beginning may enhance the viewing experience of a user, as there is less likely to be a buffering issue when the user decides to continue watching the A/V content. However, to avoid buffering interrupts, the communication device may be configured to keep the data segment that is being upgraded in the memory, and flag that data segment as being upgraded. If, subsequent to playout being resumed, the A/V content being played out approaches the flagged data segment(s), then the original lower quality version of the received A/V data segment will be retrieved from memory and played out as part of the stream.

Potential operations of both the client communication device and the server are described with reference to the flowcharts of FIGS. 3 and 4.

Figure 3:
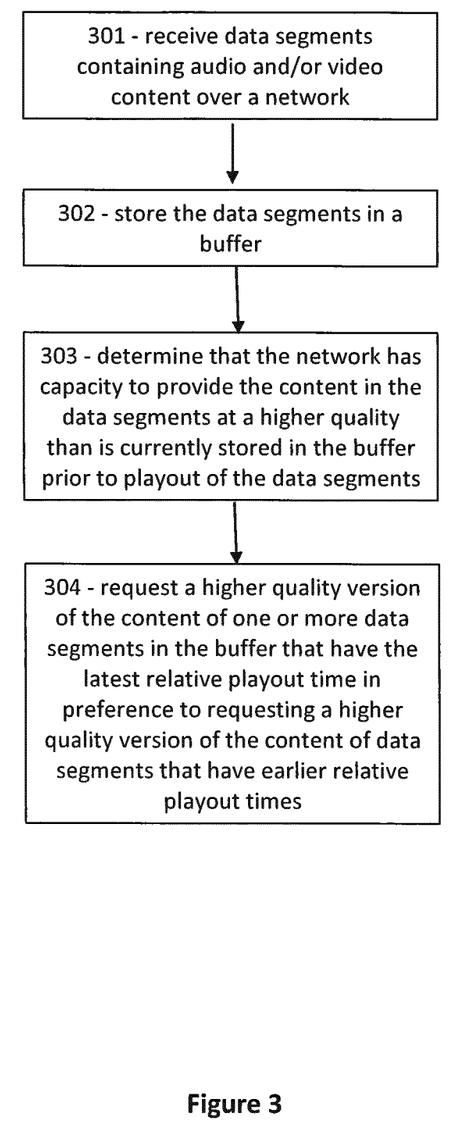
FIG. 3 is a flow chart showing potential operations by an apparatus receiving data segments of streaming audio and/or video data content.
Figure 4:
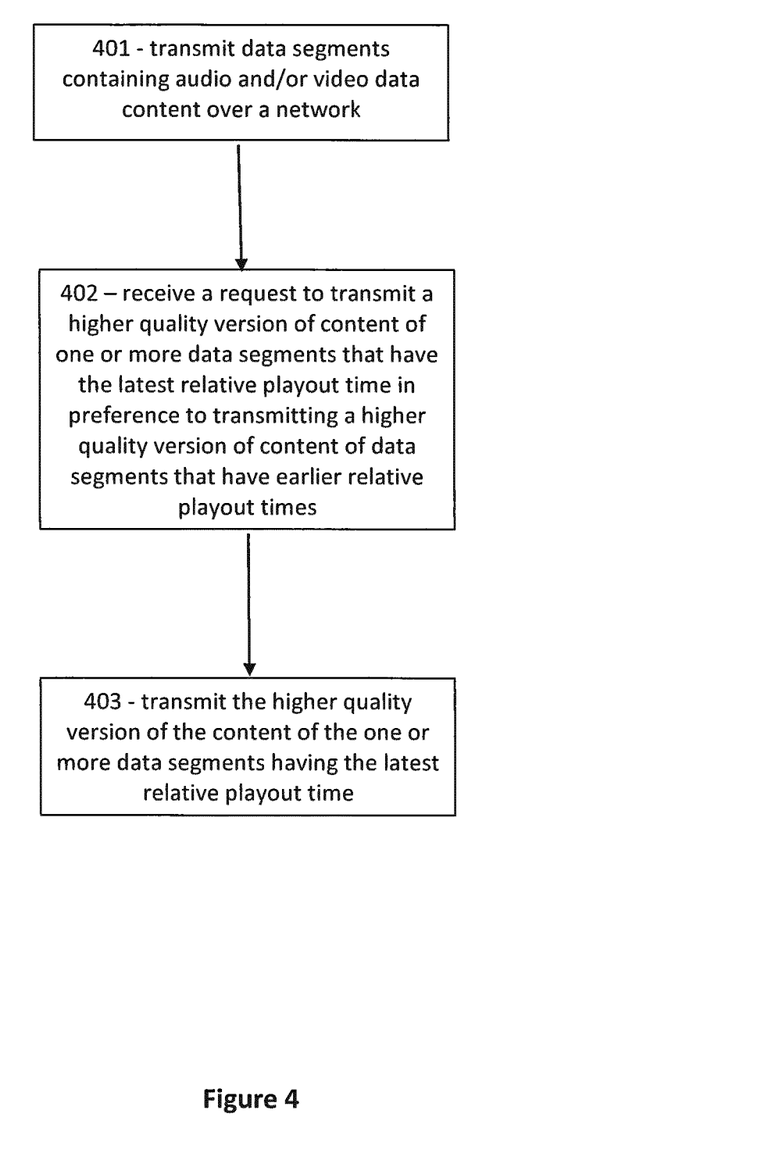
FIG. 4 is a flow chart showing potential operations by an apparatus transmitting data segments of streaming audio and/or video content.

FIG. 3 illustrates potential operations of the client communication device.

At 301, the client communication device is configured to receive data segments containing A/V content over a network. The received A/V data segments may be transmitted at a first quality. The first quality may have been requested by the client communication device. The received A/V data segments may be part of a stream of media content to be played out to a user of the communication device. The stream may be played out via a display and/or speakers that are operationally connected to the client communication device.

At 302, the client communication device is configured to store the data segments in a buffer. The buffer is operationally connected to the client communication device for this purpose.

At 303, the client communication device is configured to determine that the network has capacity to provide the content in the data segments at a second quality than is currently stored in the buffer prior to playout of the data segments. The second quality is higher than the first quality.

At 304, the client communication device is configured to request the transmittal of a higher quality version of the content of one or more data segments in the buffer that have the latest relative playout time in preference to requesting the transmittal of a higher quality version of content that have earlier relative playout times. This request may be sent to the server via the network. In response to this request, the server may transmit the data segments having the higher quality version of the A/V content having the latest/last relative playout time in preference to transmitting a higher quality version of those data segments comprising content having earlier relative playout times.

The operations of a server are described with reference to FIG. 4. As previously mentioned, the server may in fact be several different servers that cooperatively interact to perform the below described mechanism.

At 401, the server is configured to transmit data segments containing A/V content over a network to a communication device. This transmission may be the result of the communication device previously requesting to receive the content that is contained within the A/V data segments.

At 402, the server is configured to receive a request to transmit data segments having a higher quality version of the content of transmitted data segments. The request indicates that a higher quality version of content of one or more data segments that have the latest relative playout time of the transmitted content should be transmitted in preference to transmitting data segments having higher quality versions of content that have earlier relative playout times The request may be received from the client communication device.

In response to this request, at 403 the server is configured to transmit the higher quality versions of the one or more data segments having the latest relative playout time to the client communication device.

Although the above discusses pausing (or otherwise stopping) the A/V playout in order to download/request higher quality versions of received A/V content, it is understood that this is not necessary. Instead, the communication device may simply determine that it has receive all of the relevant A/V data segments and is able to receive higher quality versions of the received A/V data segments prior to playout of those data segments. However, the present system is especially useful when a user pauses and/or stops playout of A/V content as this provides more time for both allowing a large portion of the A/V data stream to be received over a relatively bad connection and to receive the improved quality versions of the A/V content.

It will be understood that the processor or processing system or circuitry referred to herein may in practice be provided by a single chip or integrated circuit or plural chips or integrated circuits, optionally provided as a chipset, an application-specific integrated circuit (ASIC), field-programmable gate array (FPGA), digital signal processor (DSP), graphics processing units (GPUs), etc. The chip or chips may comprise circuitry (as well as possibly firmware) for embodying at least one or more of a data processor or processors and a digital signal processor or processors, which are configurable so as to operate in accordance with the exemplary embodiments. In this regard, the exemplary embodiments may be implemented at least in part by computer software stored in (non-transitory) memory and executable by the processor, or by hardware, or by a combination of tangibly stored software and hardware (and tangibly stored firmware).

Reference is made herein to data storage (e.g. the above-mentioned buffer and the memory) for storing data. This may be provided by a single device or by plural devices. Suitable devices include for example a hard disk and non-volatile semiconductor memory.

The examples described herein are to be understood as illustrative examples of embodiments of the invention. Further embodiments and examples are envisaged. Any feature described in relation to any one example or embodiment may be used alone or in combination with other features. In addition, any feature described in relation to any one example or embodiment may also be used in combination with one or more features of any other of the examples or embodiments, or any combination of any other of the examples or embodiments. Furthermore, equivalents and modifications not described herein may also be employed within the scope of the invention, which is defined in the claims.

The invention claimed is:

1. A method of streaming data, the method comprising:
receiving media content over a network, the media content comprising an audio and/or video stream, the audio and/or video stream comprising data segments containing audio and/or video content;
storing the data segments in a buffer;
determining that the entire media content has been received by determining that the data segments in the buffer comprise the end of the audio and/or video stream of the media content; and,
in response to determining that the data segments in the buffer comprise the end of the audio and/or video stream of the media content:
determining that the network has capacity to provide the content in the data segments at a higher quality than is currently stored in the buffer prior to playout of the data segments; and
requesting a higher quality version of the content of one or more data segments currently stored in the buffer that have the latest relative playout time in preference to requesting a higher quality version of the content of data segments currently stored in the buffer that have earlier relative playout times.

2. A method according to claim 1, comprising:
determining that a user has paused playout of the data segments stored in the buffer,
wherein the determining that the network has capacity and the requesting data segments having a higher quality version are performed further in response to determining that the user has paused playout of the data segments stored in the buffer.

3. A method according to claim 1, comprising:
forming a plurality of groups by grouping together data segments in the buffer into groups of a maximum size, such that each data segment in a group has a playout time that is immediately adjacent to the playout time of at least one other data segment in a group;
wherein said requesting comprises requesting a higher quality version of the group of data segments having the latest relative playout times.

4. A method according to claim 1, comprising:
receiving a higher quality version of a portion of the content in the buffer;
determining that playout of said portion of the content will occur at a playout time that is prior to the higher quality version of said portion of the content being completely received; and
causing the lower quality version of said content to be played out at said playout time.

5. An apparatus for streaming data, the apparatus being constructed and arranged to:
request media content over a network, the media content comprising an audio and/or video stream, the audio and/or video stream comprising data segments containing audio and/or video content;
store the data segments in a buffer;
determine that the entire media content has been received by determining that the data segments in the buffer comprise the end of the audio and/or video stream of the media content; and,
in response to determining that the data segments in the buffer comprise the end of the audio and/or video stream of the media content:
determine that the network has capacity to provide the content in the data segments at a higher quality than is currently stored in the buffer prior to playout of the data segments; and
request a higher quality version of the content of one or more data segments currently stored in the buffer that have the latest relative playout time in preference to requesting a higher quality version of the content of data segments currently stored in the buffer that have earlier relative playout times.

6. An apparatus according to claim 5, arranged to:
determine that the network has capacity in response to receiving an indication that a user has paused playout of the data segments.

7. An apparatus according to claim 5, arranged to:
receive a user input indicating that the higher quality version of one or more data segments should be requested for the data segments having the latest relative playout time in preference to requesting higher quality versions of data segments that have earlier relative playout times; and
store the user input.

8. An apparatus according to claim 5, arranged to:
request a higher quality version of content comprised in a first data segment in the buffer;
determine that playout of the content of said first data segment will occur at a playout time that is prior to the higher quality version being completely received; and
cause the lower quality version of said content to be played out at said playout time.

9. A method of streaming data, the method comprising:
transmitting media content over a network to a client device, the media content comprising an audio and/or video stream, the audio and/or video stream comprising data segments containing audio and/or video data content;
receiving from the client device a request to transmit a higher quality version of the content of one or more data segments that comprise the end of an audio and/or video stream currently stored in a buffer of the client device and that have the latest relative playout time of the transmitted content in preference to transmitting a higher quality version of the content of data segments currently stored in the buffer of the client device that have earlier relative playout times, the request being sent by the client device in response to the client device determining that the entire media content has been received by the client device; and
transmitting the higher quality version of the content of the one or more data segments having the latest relative playout time to the client device.

10. An apparatus for streaming data, being constructed and arranged to:
transmit media content over a network to a client device, the media content comprising an audio and/or video stream, the audio and/or video stream comprising data segments containing audio and/or video data content;
receive from the client device a request to transmit a higher quality version of the content of one or more data segments that comprise the end of an audio and/or video stream currently stored in a buffer of the client device and that have the latest relative playout time of the transmitted content in preference to transmitting a higher quality version of the content of data segments currently stored in the buffer of the client device that have earlier relative playout times, the request being sent by the client device in response to the client device determining that the entire media content has been received by the client device; and
transmit the higher quality version of content of the one or more data segments having the latest relative playout time to the client device.

11. A non-transitory memory device for a computer, the memory device storing a computer program, the computer program comprising computer code that, when executed by the computer, causes the computer to perform a method of streaming data, the method comprising:
receiving media content over a network, the media content comprising an audio and/or video stream, the audio and/or video stream comprising data segments containing audio and/or video content;
storing the data segments in a buffer;
determining that the entire media content has been received by determining that the data segments in the buffer comprise the end of the audio and/or video stream of the media content; and,
in response to determining that the data segments in the buffer comprise the end of the audio and/or video stream of the media content:
determining that the network has capacity to provide the content in the data segments at a higher quality than is currently stored in the buffer prior to playout of the data segments; and
requesting a higher quality version of the content of one or more data segments currently stored in the buffer that have the latest relative playout time in preference to requesting a higher quality version of the content of data segments currently stored in the buffer that have earlier relative playout times.

12. A non-transitory memory device for a computer, the memory device storing a computer program, the computer program comprising computer code that, when executed by the computer, causes the computer to perform a method of streaming data, the method comprising:
transmitting media content over a network to a client device, the media content comprising an audio and/or video stream, the audio and/or video stream comprising data segments containing audio and/or video data content;
receiving from the client device a request to transmit a higher quality version of the content of one or more data segments that comprise the end of an audio and/or video stream currently stored in a buffer of the client device and that have the latest relative playout time of the transmitted content in preference to transmitting a higher quality version of the content of data segments currently stored in the buffer of the client device that have earlier relative playout times, the request being sent by the client device in response to the client device determining that the entire media content has been received by the client device; and
transmitting the higher quality version of the content of the one or more data segments having the latest relative playout time to the client device.

* * * * *